United States Patent
Parappillil Baby et al.

(10) Patent No.: US 12,449,671 B2
(45) Date of Patent: Oct. 21, 2025

(54) PORTABLE SPECKLE IMAGING SYSTEM AND METHOD FOR AUTOMATED SPECKLE ACTIVITY MAP BASED DYNAMIC SPECKLE ANALYSIS

(71) Applicant: Tata Consultancy Services Limited, Mumbai (IN)

(72) Inventors: Renju Parappillil Baby, Bangalore (IN); Parama Pal, Bangalore (IN); Beena Rai, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 678 days.

(21) Appl. No.: 17/952,715

(22) Filed: Sep. 26, 2022

(65) Prior Publication Data
US 2023/0130329 A1     Apr. 27, 2023

(30) Foreign Application Priority Data
Oct. 21, 2021   (IN) .............................. 202121047946

(51) Int. Cl.
    *G02B 27/48*     (2006.01)
    *G01N 21/47*     (2006.01)
    *G06T 5/50*      (2006.01)

(52) U.S. Cl.
    CPC ......... *G02B 27/48* (2013.01); *G01N 21/4788* (2013.01); *G06T 5/50* (2013.01);
    (Continued)

(58) Field of Classification Search
    CPC .............. G02B 27/48; G01N 21/4788; G01N 2021/479; G01N 2201/0221; G06T 5/50; G06T 2207/30104
    See application file for complete search history.

(56) References Cited

U.S. PATENT DOCUMENTS

2012/0162438 A1   6/2012   Thakor et al.
2015/0362312 A1*  12/2015  Higo ..................... G06T 7/586
                                                         356/610

FOREIGN PATENT DOCUMENTS

CN        115291381 A  * 11/2022  ........... G02B 21/244

OTHER PUBLICATIONS

Daffara et al., "A Portable Compact System for Laser Speckle Correlation Imaging of Artworks Using Projected Speckle Pattern," J. Imaging, 6(119) (2020).
(Continued)

*Primary Examiner* — Tony Ko
(74) *Attorney, Agent, or Firm* — Finnegan, Henderson, Farabow, Garrett & Dunner, LLP

(57) ABSTRACT

This disclosure relates to portable speckle imaging system and method for automated speckle activity map based dynamic speckle analysis. The embodiments of present disclosure herein address unresolved problem of capturing variations in speckle patterns where noise is completely removed and dependency on intensity of variations in speckle patterns is eliminated. The method of the present disclosure provides a correlation methodology for analyzing laser speckle images for applications such as seed viability, fungus detection, surface roughness analysis, and/or the like by capturing temporal variation from frame to frame and ignoring the intensity of speckle data after denoising, thereby providing an effective mechanism to study speckle time series data. The system and method of the present disclosure performs well in terms of time efficiency and visual cues and requires minimal human intervention.

15 Claims, 21 Drawing Sheets

(52) U.S. Cl.
CPC ............ *G01N 2021/479* (2013.01); *G06T 2207/30104* (2013.01)

(56) References Cited

OTHER PUBLICATIONS

Richards et al., "Low-cost laser speckle contrast imaging of blood flow using a webcam," Biomedical Optics Express, 4(10) (2013).
Singh et al., "Biospeckle-Based Sensor for Characterization of Charcoal Rot (*Macrophomina phaseolina* (Tassi) Goid) Disease in Soybean (*Glycine max* (L.) *Merr*.I) Crop," 9 (2021).

* cited by examiner

PORTABLE SPECKLE IMAGING SYSTEM AND METHOD FOR AUTOMATED SPECKLE ACTIVITY MAP BASED DYNAMIC SPECKLE ANALYSIS

PRIORITY CLAIM

This U.S. patent application claims priority under 35 U.S.C. § 119 to: India Application No. 202121047946, filed on Oct. 21, 2021. The entire contents of the aforementioned application are incorporated herein by reference.

TECHNICAL FIELD

The disclosure herein generally relates to speckle analysis, and, more particularly, to portable speckle imaging system and method for automated speckle activity map based dynamic speckle analysis.

BACKGROUND

Speckle imaging particularly laser speckle imaging is a well-established technique in multiple applications including surface roughness analysis, biological activity analysis such as fungus detection and seed viability analysis in plants and blood flow analysis in humans. A speckle image could be obtained using a coherent light scattered from a target. If the target includes scatterers at a variety of different depths, the scattering causes originally coherent light to add constructively or destructively depending on the various path lengths from the various scatterers, resulting in an image with bright and dark spots which are referred as speckles. Though, there exist methods for speckle imaging and analysis, some of them are highly dependent on intensity of speckle patterns and a few existing methods do not capture temporal variations. Thus, conventional systems and methods fail to perform well in varying scenarios.

SUMMARY

Embodiments of the present disclosure present technological improvements as solutions to one or more of the above-mentioned technical problems recognized by the inventors in conventional systems. For example, in one embodiment, a portable laser speckle imaging system is provided. The system comprising: a power source, a first light source with a holder support positioned to emit a beam towards a target object, an image capturing device positioned to receive illumination scattered from the target object, a second light source positioned in line with the image capturing device to enable white illumination on the target object, an attenuator to control intensity of the beam emitted by the first light source, a beam expander positioned between the first light source and the attenuator to control size of the beam emitted by the first light source, a polarizer lens positioned between the attenuator and the target object to polarize the beam emitted by the first light source, and a controller unit operably connected to the first light source, the image capturing device, and the second light source. In an embodiment, the controller unit comprises: one or more data storage devices configured to store instructions; one or more communication interfaces; and one or more hardware processors operatively coupled to the one or more data storage devices via the one or more communication interfaces, wherein the one or more hardware processors are configured by the instructions to: acquire, a plurality of first type of images and a second type of image of the target object from the image capturing device, wherein the plurality of first type of images are acquired when the target object is illuminated by the first light source and the second type of image is acquired when the target object is illuminated by the second light source; perform, one or more masking operations on the second type of image to obtain a masked image; obtain, by performing an automated speckle activity map based dynamic speckle analysis technique on the plurality of first type of images, a third type of image, wherein obtaining the third type of image by performing the automated speckle activity map based dynamic speckle analysis comprises: determining absolute difference between consecutive images in the plurality of first type of images to obtain a plurality of difference images; assigning, a value to each pixel of each of the plurality of difference images based on a comparison with a first threshold; adding the plurality of difference images having a value assigned to each pixel to obtain a resultant image; and obtaining, based on a comparison of each pixel of the resultant image with a second threshold, the third type of image; and determine a target image by multiplying the third type of image with the masked image, wherein an area indicative of a level of one or more activities occurring within the target object is detected from the target image.

In another embodiment, a processor implemented method is provided. The method comprising acquiring, a plurality of first type of images and a second type of image of the target object from the image capturing device, wherein the plurality of first type of images are acquired when the target object is illuminated by the first light source and the second type of image is acquired when the target object is illuminated by the second light source; performing, one or more masking operations on the second type of image to obtain a masked image; obtaining, by performing an automated speckle activity map based dynamic speckle analysis technique on the plurality of first type of images, a third type of image, wherein obtaining the third type of image by performing the automated speckle activity map based dynamic speckle analysis comprises: determining absolute difference between consecutive images in the plurality of first type of images to obtain a plurality of difference images; assigning, a value to each pixel of each of the plurality of difference images based on a comparison with a first threshold; adding the plurality of difference images having a value assigned to each pixel to obtain a resultant image; and obtaining, based on a comparison of each pixel of the resultant image with a second threshold, the third type of image; and determining a target image by multiplying the third type of image with the masked image, wherein an area indicative of a level of one or more activities occurring within the target object is detected from the target image.

In yet another embodiment, a non-transitory computer readable medium is provided. The non-transitory computer readable medium comprising: acquiring, a plurality of first type of images and a second type of image of the target object from the image capturing device, wherein the plurality of first type of images are acquired when the target object is illuminated by the first light source and the second type of image is acquired when the target object is illuminated by the second light source; performing, one or more masking operations on the second type of image to obtain a masked image; obtaining, by performing an automated speckle activity map based dynamic speckle analysis technique on the plurality of first type of images, a third type of image, wherein obtaining the third type of image by performing the automated speckle activity map based dynamic speckle analysis comprises: determining absolute difference between consecutive images in the plurality of first type of images to obtain a plurality of difference images; assigning, a value to each pixel of each of the plurality of difference images based on a comparison with a first threshold; adding the plurality of difference images having a value assigned to each pixel to obtain a resultant image; and obtaining, based on a comparison of each pixel of the resultant image with a second threshold, the third type of image; and determining a target image by multiplying the third type of image with the masked image, wherein an area indicative of a level of one or more activities occurring within the target object is detected from the target image.

In an embodiment, the first threshold is computed by: determining, in a simultaneous manner, a product of the plurality of first type of images with the masked image and an inverted masked image to obtain a plurality of first type of masked images and a plurality of second type of masked images; determining absolute difference between consecutive images in the plurality of first type of masked images and the second type of masked images to obtain a plurality of first type of resultant images and a plurality of second type of resultant images; obtaining a first type of array and a second type of array by performing a flattening operation on the plurality of first type of resultant images and the plurality of second type of resultant images; and determining a cross over point of histogram plots of the first type of array and the second type of array, wherein the cross over point is computed as the first threshold.

In an embodiment, the first light source is a coherent light source that includes a laser light emitter.

In an embodiment, the second light source includes at least one of (i) a ring light that comprises an array of light emitting diodes arranged in a circular pattern, and (ii) a white light source with a front trasmittive diffuser.

In an embodiment, each of the plurality of first type of image represents a laser speckle image and the second type of image represents a white light image.

In an embodiment, the one or more masking operations performed on the second type of image to obtain the masked image include background subtraction and thresholding.

In an embodiment, the inverted masked image is obtained by performing a foreground detection on the second type of image.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
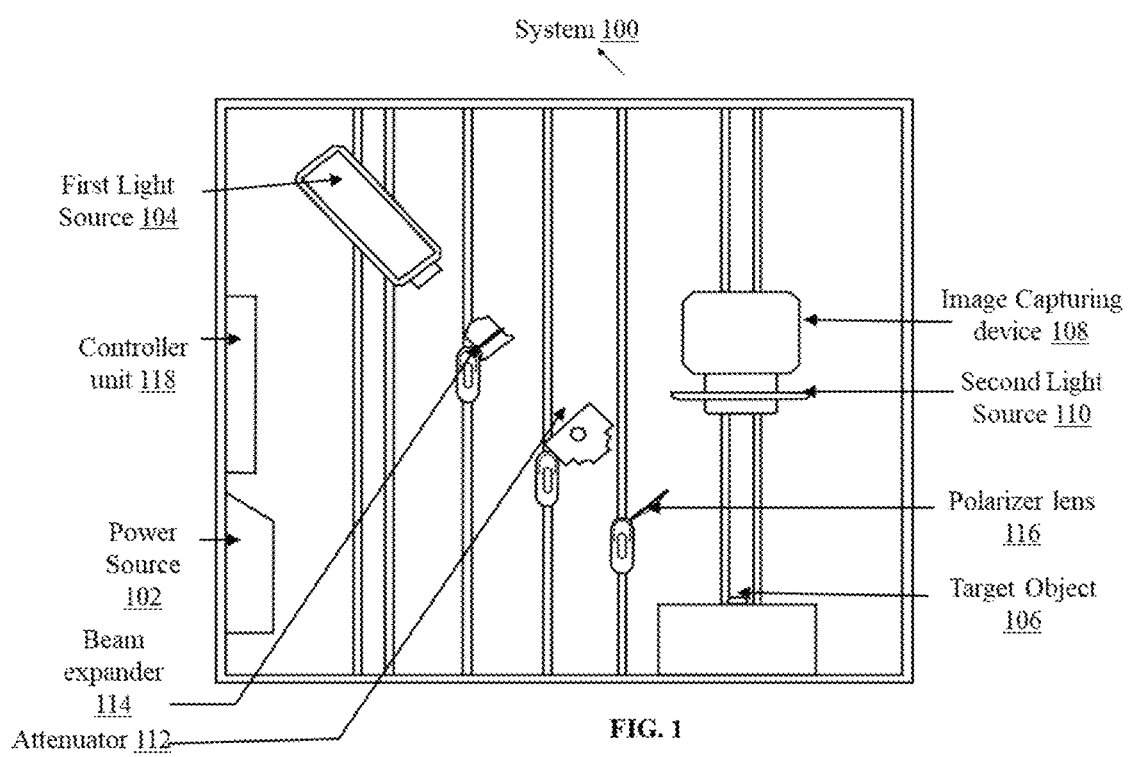
FIG. 1 illustrates an exemplary block diagram of a portable laser speckle imaging system for automated speckle activity map based dynamic speckle analysis according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The present disclosure is directed to a portable speckle imaging system and method for automated speckle activity map based dynamic speckle analysis. The typical interpretation of results obtained from conventional speckle analysis systems and methods has been modified to solve a problem of capturing variations in speckle patterns where noise is completely removed and dependency on intensity of variations in speckle patterns is eliminated. Traditionally, speckle imaging systems determine a correlation between adjacent frames. However, in a few traditional approaches, due to dependency on intensity, speckle variation at higher intensities get nullified. Further, there exists a few conventional approaches which try to capture overall temporal variation ignoring frame to frame variations and few other approaches assume temporal correlation between each frame with every other frame within a speckle sequence. This makes the existing methods to not perform well in varying scenarios. However, the method of the present disclosure captures the temporal variation from frame to frame by ignoring the intensity of speckle data after denoising, thereby provides an effective mechanism to study speckle time series data.

In the context of the present disclosure, the expressions 'image', and 'frame' may be used interchangeably. Although further description of the present disclosure is directed to speckle imaging technique and specifically laser speckle imaging technique, it may be noted that the described application is non-limiting and systems and methods of the present disclosure may be applied in any domain such as plant health analysis, biomedical imaging, paint analysis using surface roughness analysis.

Referring now to the drawings, and more particularly to FIGS. 1 through 14D, where similar reference characters denote corresponding features consistently throughout the figures, there are shown preferred embodiments and these embodiments are described in the context of the following exemplary system and/or method.

Reference numerals of one or more components of the portable laser speckle imaging system as depicted in the FIG. 1 are provided in Table 1 below for ease of description:

TABLE 1

| Sr. No. | Component | Reference numeral |
|---|---|---|
| 1 | Power source | 102 |
| 2 | First light source | 104 |
| 3 | Target object | 106 |
| 4 | Image capturing device | 108 |
| 5 | Second light source | 110 |
| 6 | Attenuator | 112 |
| 7 | Beam expander | 114 |
| 8 | Polarizer lens | 116 |
| 9 | Controller unit | 118 |
| 10 | Data storage device/Memory | 118A |
| 11 | Communication interface | 118B |
| 12 | Hardware processor | 118C |

Figure 2A:
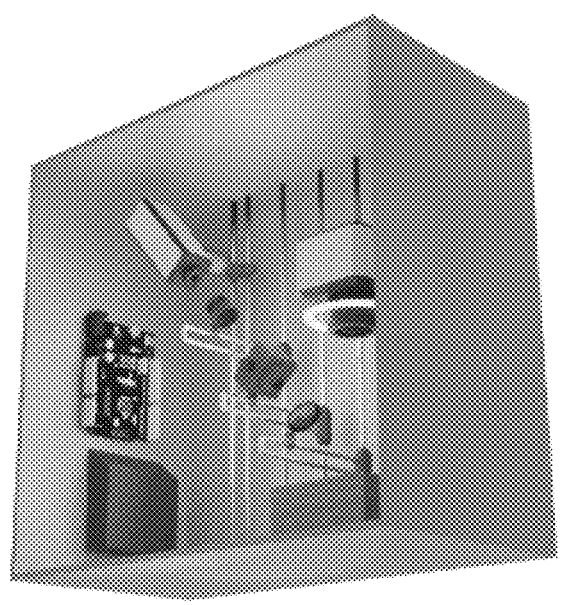
FIGS. 2A and 2B illustrate an exemplary representation (not to scale) of a left side view and a right side view of the portable laser speckle imaging system 100 for automated speckle activity map based dynamic speckle analysis respectively according to some embodiments of the present disclosure.
Figure 2B:
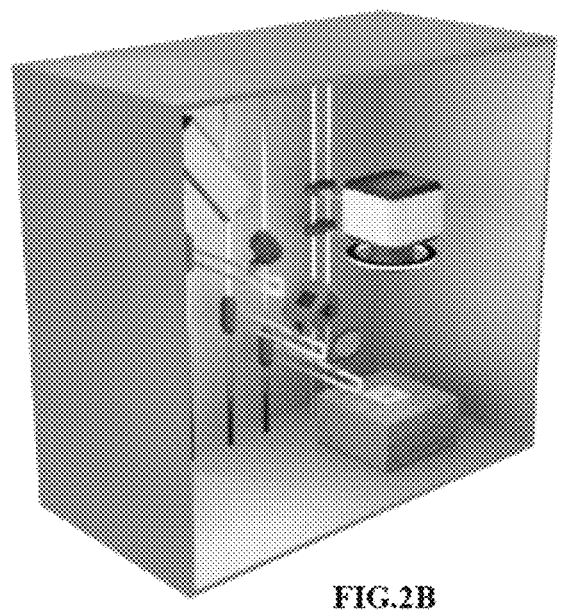

FIG. 1 illustrates an exemplary block diagram of a portable laser speckle imaging system for automated speckle activity map based dynamic speckle analysis according to some embodiments of the present disclosure. In an embodiment, the portable laser speckle imaging system 100 includes a power source 102 which may include but not limited to a battery, a first light source 104 with a holder support positioned to emit a beam towards a target object 106, an image capturing device 108 positioned to receive illumination scattered from the target object 106, an attenuator 112 to control intensity of the beam emitted by the first light source 104, a beam expander 114 positioned between the first light source 104 and the attenuator 112 to control size of the beam emitted by the first light source 104, a polarizer lens 116 positioned between the attenuator 112 and the target object 106 to polarize the beam emitted by the first light source 104, and a controller unit 118 operably connected to the first light source 104, the image capturing device 108 and the second light source 110. FIGS. 2A and 2B illustrate an exemplary representation (not to scale) of a left side view and a right side view of the portable laser speckle imaging system 100 for automated speckle activity map based dynamic speckle analysis respectively according to some embodiments of the present disclosure.

In an embodiment, the first light source is a coherent light source that includes a laser light emitter. Here, the laser light emitter (alternatively referred as laser diode) emits the beam within a frequency range of 400 nm to 700 nm. Further, the holder supports are required to hold the components of the portable laser speckle imaging system in a stable manner for easy imaging. In an embodiment, the image capturing device 108 may include but not limited to a camera such as a dslr camera with good wide angle or macro lens. In an embodiment, the second light source 110 includes at least one of (i) a ring light that comprises an array of light emitting diodes arranged in a circular pattern and (ii) a white light source with a front trasmittive diffuser. The ring light is used to avoid the shadows in the target object being imaged and can be powered by 5 v 500 mA usb output. In context of the present disclosure, the target object is a seed specimen that needs to be analyzed and is kept on a colored paper (say green paper) placed on a wooden platform. Here the green paper acts as backdrop for separating the seed specimen from background, thereby providing better background subtraction. In an embodiment, the beam expander is similar to a microscopic device with 40× magnification and the polarizer lens could be an infrared (IR) filter. In an embodiment, the laser diode, the beam expander, the attenuator and the polarizer lens are translatable and rotatable along the holder and each of them are removable and replaceable keeping other components intact.

Figure 3:
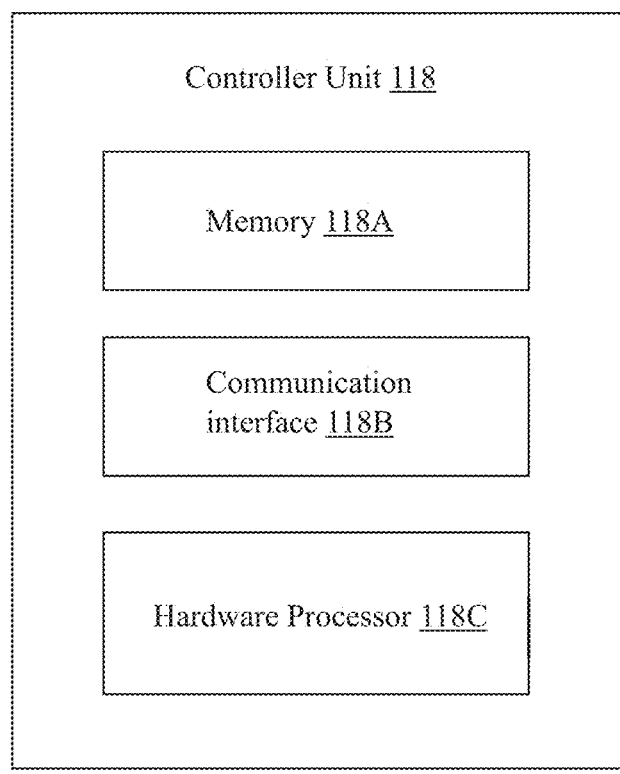
FIG. 3 is an exemplary block diagram of a controller unit comprised in the portable laser speckle imaging system for automated speckle activity map based dynamic speckle analysis according to some embodiments of the present disclosure.

In an embodiment, the controller unit may include but not limited to a wired controller such as Arduino® board, a Bluetooth® controller, a WiFi controller and/or a combination thereof. FIG. 3 is an exemplary block diagram illustrating functioning of the power source and the controller unit comprised in the portable laser speckle imaging system for automated speckle activity map based dynamic speckle analysis according to some embodiments of the present disclosure. In an embodiment, the camera is directly connected to the battery and can be controlled by Bluetooth® or wired i2c communication from the Arduino® board. The controller unit is powered by 5 v 5000 mah battery. The Bluetooth® controller such as HC05 and/or the like is interfaced to the Arduino® controller as shown in FIG. 3. Further, power to the first light source and the second light source is supplied through power out gpio pins of the Arduino® controller. The Arduino® controller is connected to the camera via Bluetooth® and constantly communicates. In an embodiment, the controller unit 118 controls turning on and off of the image capturing device, the first light source and the second light source.

Figure 4:
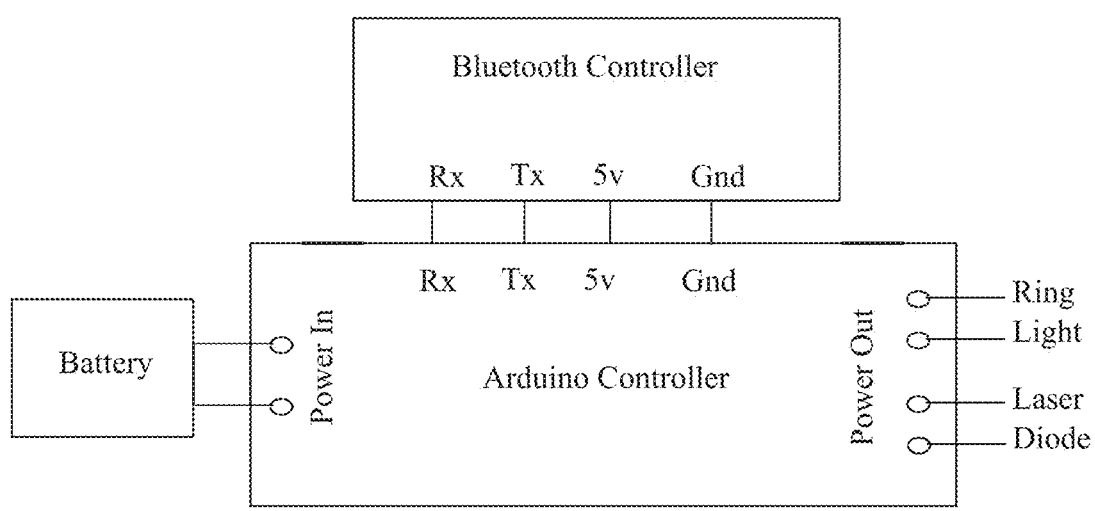
FIG. 4 is an exemplary block diagram illustrating functioning of the power source and the controller unit comprised in the portable laser speckle imaging system for automated speckle activity map based dynamic speckle analysis according to some embodiments of the present disclosure.

FIG. 4 illustrates an exemplary block diagram of the controller unit 118 comprised in the portable laser speckle imaging system 100 for automated speckle activity map based dynamic speckle analysis according to some embodiments of the present disclosure. As shown in FIG. 3, the controller unit 118 further comprises one or more data storage devices or memory 118A configured to store instructions, one or more communication interfaces 118B, and one or more hardware processors 118C operatively coupled to the one or more data storage devices 118A via the one or more communication interfaces 116B.

The one or more hardware processors 118C can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the one or more hardware processors 118C can be implemented in a variety of computing systems, such as laptop computers, notebooks, hand-held devices, workstations, mainframe computers, servers, a network cloud and the like.

In an embodiment, the communication interface(s) or input/output (I/O) interface(s) 118B may include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The one or more data storage devices or memory 118A may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 5:
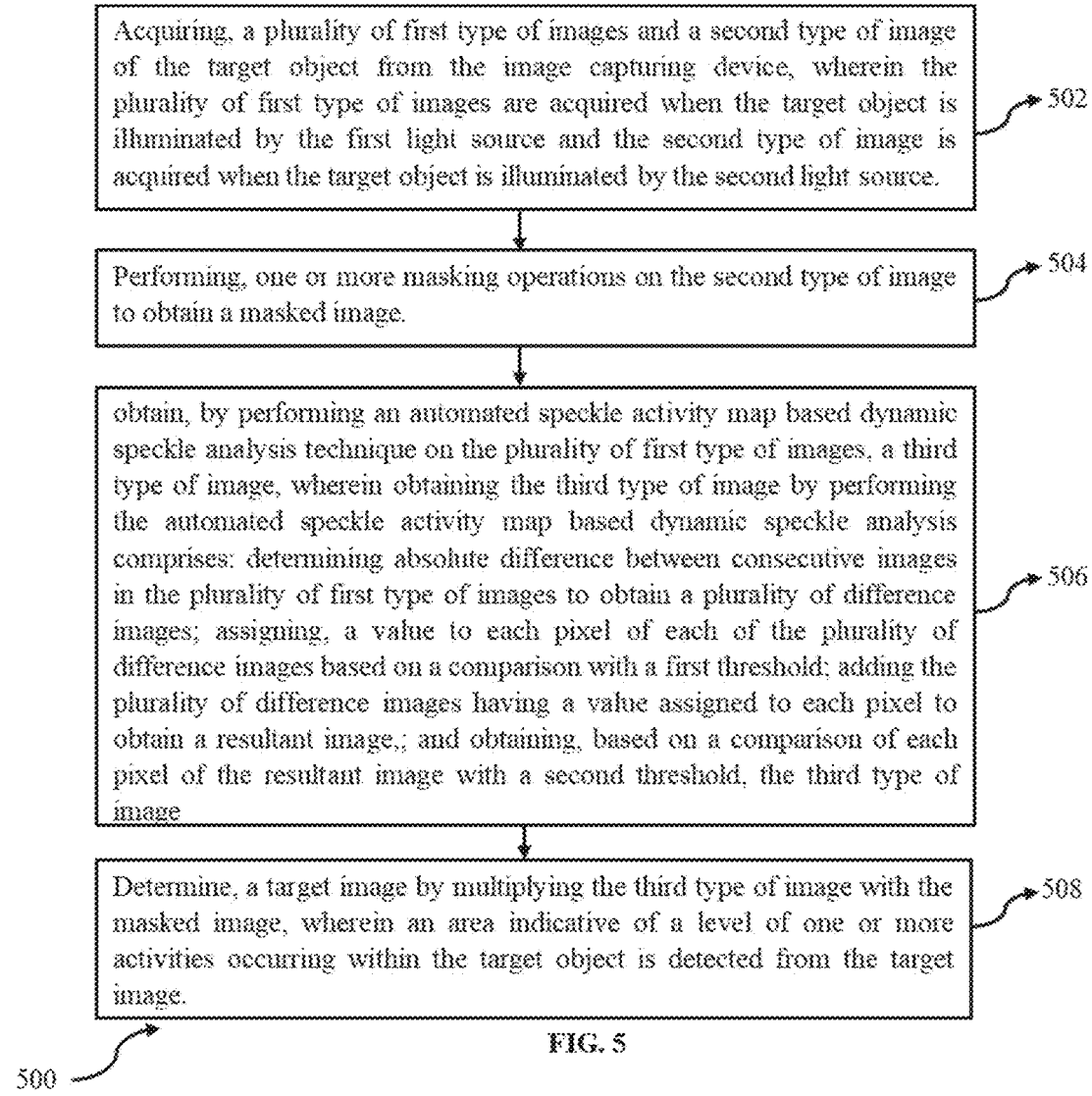
FIG. 5 is an exemplary flow diagram illustrating a portable laser speckle imaging method for automated speckle activity map based dynamic speckle analysis according to some embodiments of the present disclosure.

In an embodiment, the one or more hardware processors 118C can be configured to perform a portable laser speckle imaging method for automated speckle activity map based dynamic speckle analysis, which can be carried out by using methodology, described in conjunction with FIG. 5, and use case examples.

FIG. 5 is an exemplary flow diagram illustrating a portable laser speckle imaging method for automated speckle activity map based dynamic speckle analysis using the controller unit 118 of FIG. 3 comprised in the system 100 of FIG. 1, according to some embodiments of the present disclosure. In an embodiment, the controller unit 118 comprises one or more data storage devices or the memory 118A operatively coupled to the one or more processors 118C and is configured to store instructions for execution of steps of the method 500 by the one or more processors 118C. The steps of the method 500 of the present disclosure will now be explained with reference to the components or blocks of the system 100 as depicted in FIG. 1, and the steps of flow diagram as depicted in FIG. 3. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Figure 6:
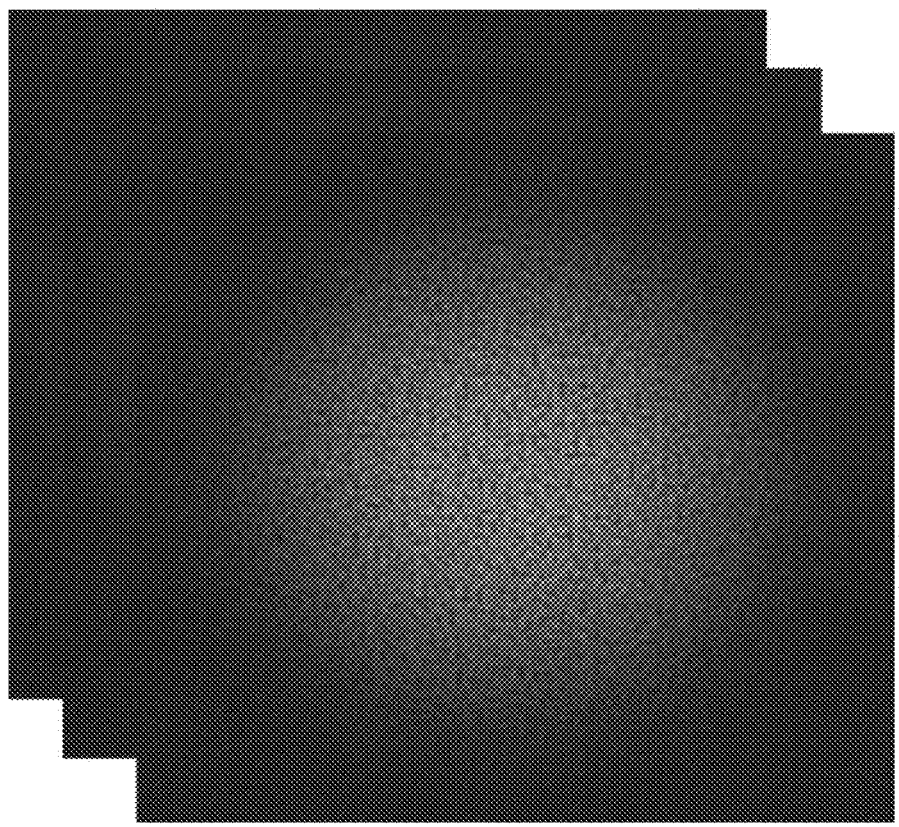
FIG. 6 shows an example of a plurality of laser speckle images of a target object according to some embodiments of the present disclosure.
Figure 7:
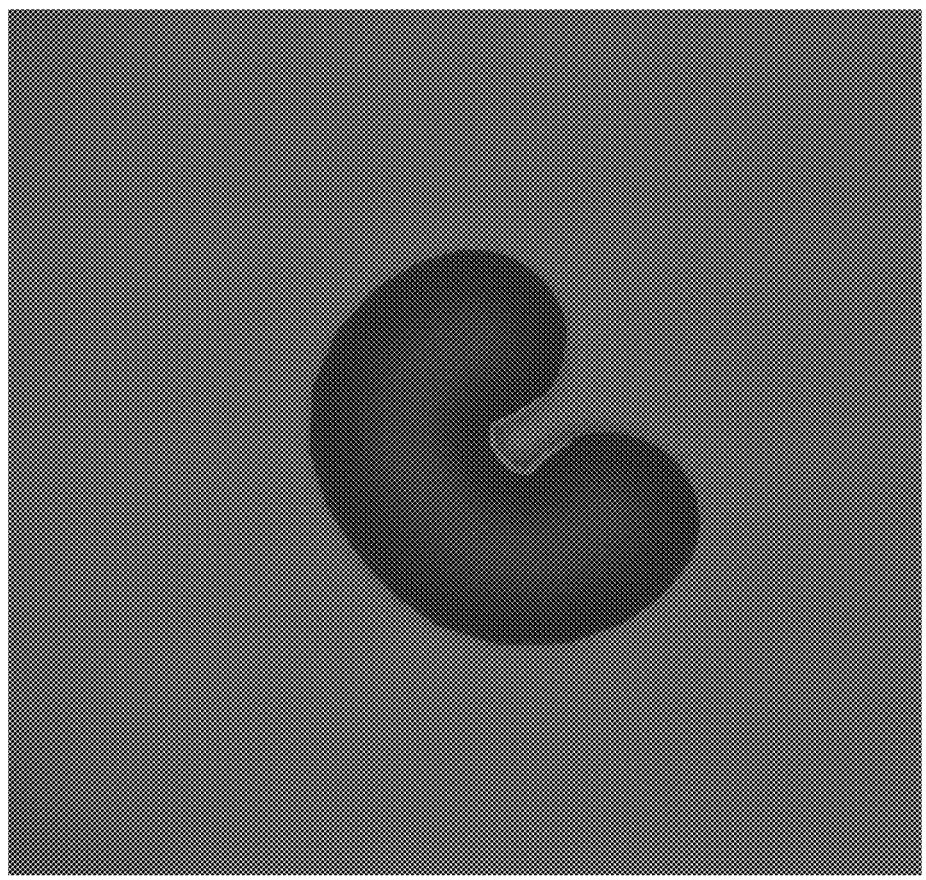
FIG. 7 shows an example of a white light image of the target object according to some embodiments of the present disclosure.

Referring to the steps of the method 500 depicted in FIG. 5, in an embodiment of the present disclosure, at step 502, the one or more hardware processors 118C are configured to acquire a plurality of first type of images and a second type of image of the target object from the image capturing device. In an embodiment, the plurality of first type of images are acquired when the target object is illuminated by the first light source and the second type of image is acquired when the target object is illuminated by the second light source. In an embodiment, the first type of image represents a laser speckle image and the second type of image represents a white light image. Here, the white light image represents a standard RGB image acquired by the camera under natural/white light. FIG. 6 shows an example of a plurality of laser speckle images of a target object according to some embodiments of the present disclosure. FIG. 7 shows an example of a white light image of the target object according to some embodiments of the present disclosure. In an embodiment, when the battery is turned on, Bluetooth communication between the Arduino® controller and the camera is established. Further, inputs to the first light source and the second light source are connected to the battery through the Arduino® controller, all components comprised in the portable laser speckle imaging system 100 are aligned and settings of the camera such as shutter speed, International Organization of Standardization (ISO), and aperture are fixed. Initially, both the first light source and the second light source are off and a record command in the camera is initiated by the Arduino® uno controller. Then same controller turns ON the first light source and the camera captures a series of laser speckle images (say 150-200 images), which are referred to as first type of images. Further, the Arduino® controller turns OFF the first light source and turns ON the second light source to capture a single white light image of the target object (the second type of image). Further, the second light source also gets turned off.

Figure 8:
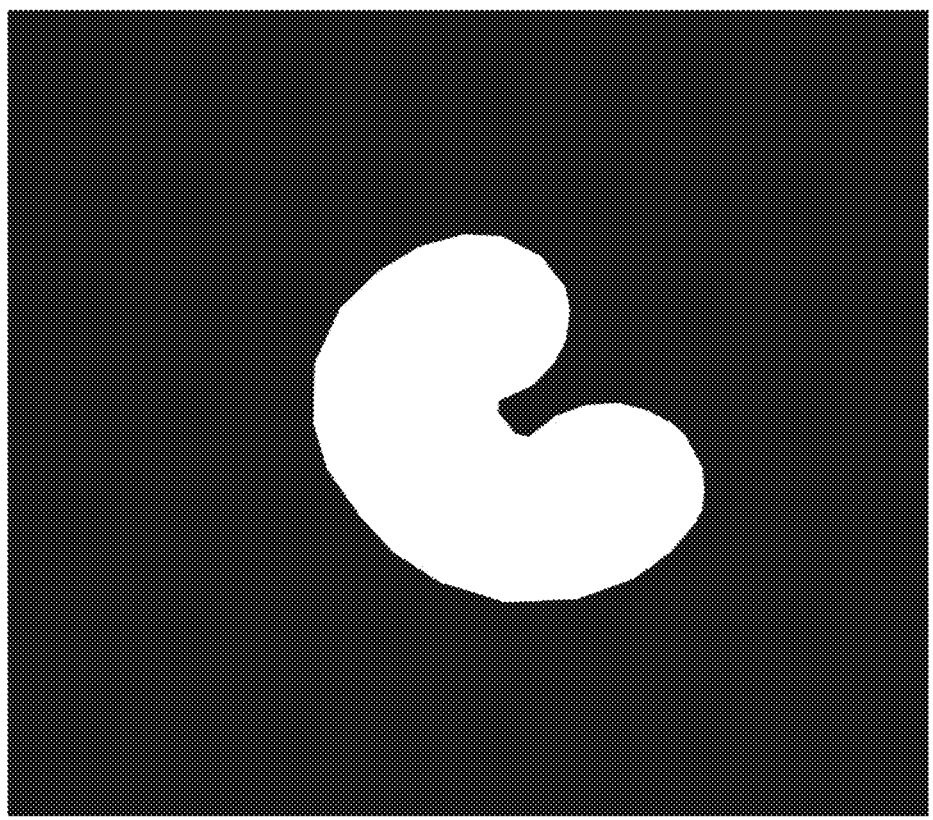
FIG. 8 shows an example of a masked image of the target object according to some embodiments of the present disclosure.

Upon acquiring the plurality of first type of images and a second type of image, in an embodiment of the present disclosure, at step 504, the one or more hardware processors 118C are configured to perform, one or more masking operations on the second type of image to obtain a masked image. FIG. 8 shows an example of a masked image of the target object according to some embodiments of the present disclosure. In this case, the target object assumed is a seed. In an embodiment, the one or more masking operations performed on the second type of image to obtain the masked image include background subtraction and thresholding. In other words, from the white light image captured by the camera, green backdrop is separated out to obtain the masked image of the seed. Further, background subtraction is performed in which portion covered with seed in the white light image is assigned a pixel value 1 and becomes white. Remaining portion is assigned with a value 0 and appears black. It should be appreciated that use of any other similar technique is well within the scope of this disclosure. As shown in FIG. 8, the masked image for a seed represents a seed portion mask. Further, in an embodiment of the present disclosure, at step 506, the one or more hardware processors 118C are configured to obtain, by performing an automated speckle activity map based dynamic speckle analysis technique on the plurality of first type of images, a third type of image. In other words, from the plurality of laser images captured, a single binary color image is obtained by applying the automated speckle activity map based dynamic speckle analysis technique. The single binary color image is referred as the third type of image and shows area of one or more activities occurring within the seed. In the binary color image, areas with activity and no activities could be shown with different colors such as light shaded color may indicate presence of activity and dark shaded may indicate no activity. In an embodiment, obtaining the third type of image by performing the automated speckle activity map based dynamic speckle analysis comprises: determining absolute difference between consecutive images in the plurality of first type of images to obtain a plurality of difference images. In an embodiment, laser image frames are assumed of dimension X, Y and N, where X and Y are height and width of the laser image frame respectively and N represent number of temporal frames. Here, the laser image frames are represented by $I_0, I_1 \ldots I_{N-1}, I_N$. Then, adjacent frames from the laser images frames are subtracted and their absolute values are calculated as $D_0=|I_0-I_1| \ldots D_{N-1}=|I_{N-1}-I_N|$. Here, the plurality of difference images is represented by $D_0 \ldots D_N$ and are stored as a D matrix. Further, a value to each pixel of each of the plurality of difference images is assigned based on a comparison with a first threshold. For example, if value of the first threshold is $20(T_0)$, then each pixel in $D_0 \ldots D_N$ is checked and compared with $20(T_0)$. If intensity of the pixel is greater than $20(T_0)$, then the pixel is assigned a value 1 else 0. For example, if $D_0 (x, y)>20$, then $D_0 (x, y)=1$ else, $D_0 (x, y)=0$. The process is repeated for all the pixels in D matrix of dimension [X,Y,N−1].

Figure 9:
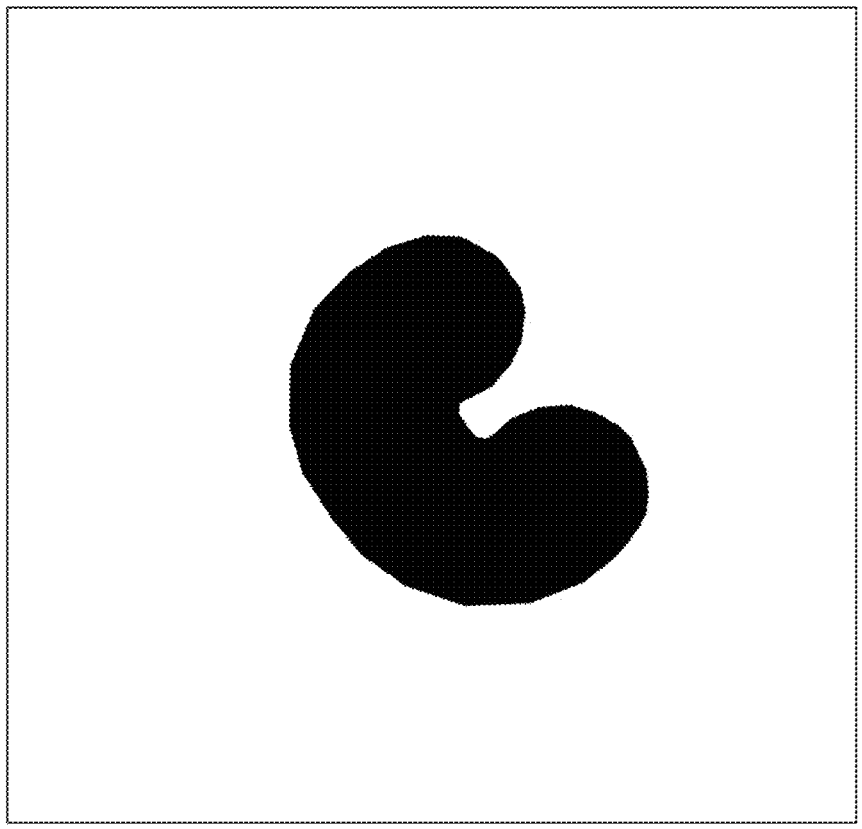
FIG. 9 shows an example of an inverted masked image of the target object according to some embodiments of the present disclosure.
Figure 10A:
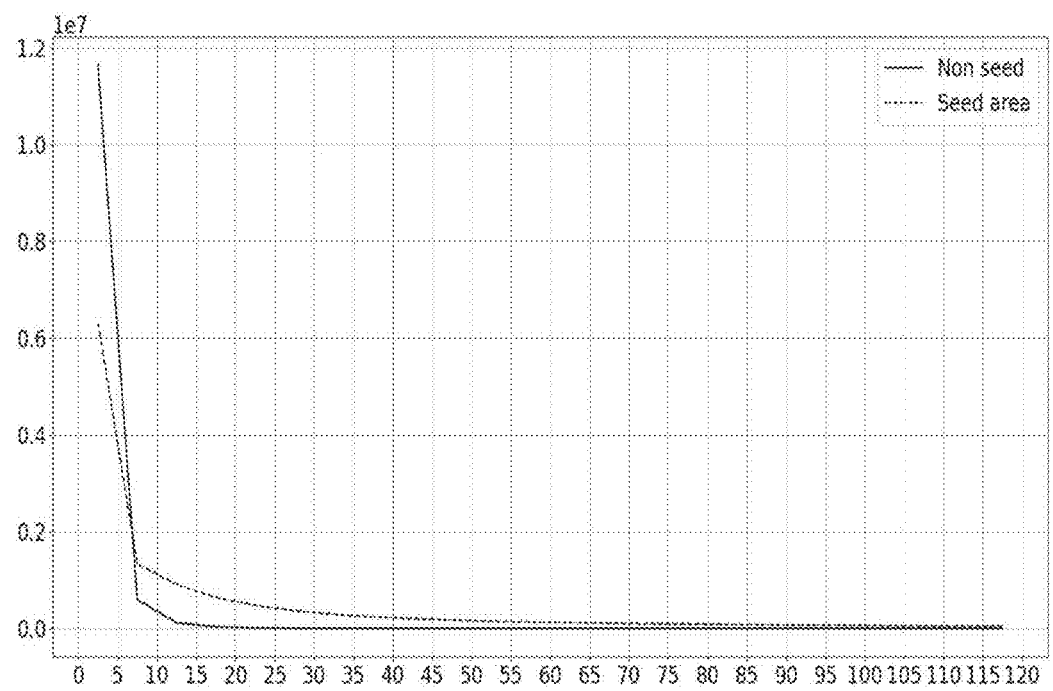
FIGS. 10A and 10B illustrate histogram plots of a maize seed and a coffee seed respectively to compute a first threshold value according to some embodiments of the present disclosure.
Figure 10B:
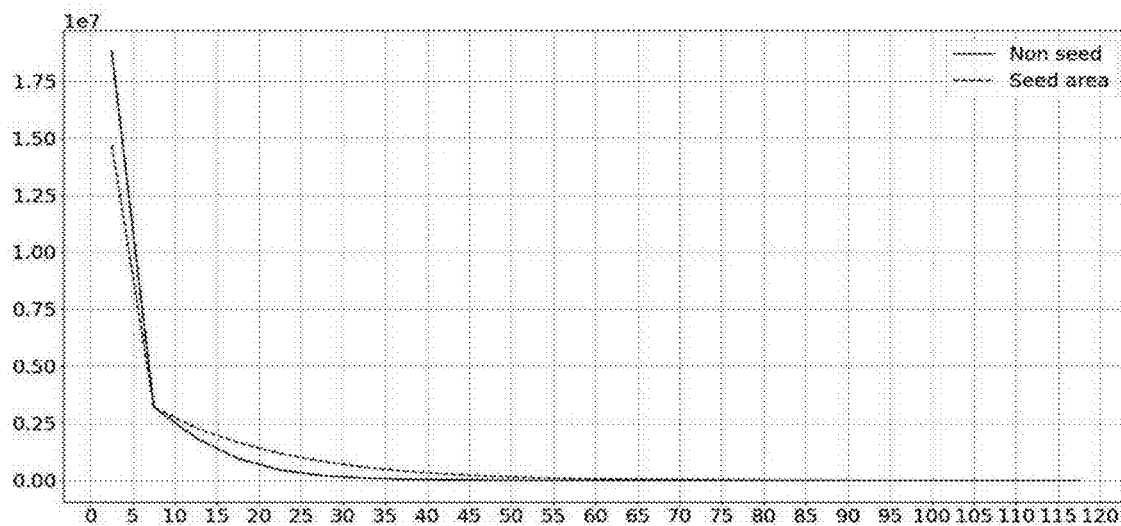

In an embodiment, the first threshold is computed by first determining, in a simultaneous manner, a product of the plurality of first type of images with the masked image and an inverted masked image to obtain a plurality of first type of masked images and a plurality of second type of masked images. In an embodiment, the inverted masked image is obtained by performing foreground detection on the second type of image. FIG. 9 shows an example of an inverted masked image of the target object according to some embodiments of the present disclosure. As shown in FIG. 9, the inverted masked image for a seed represents a seedless portion mask. The plurality of first type of masked images are obtained by multiplying each laser frame from the plurality of laser frames with the masked image (e.g., seed portion mask) and plurality of second type of masked images by multiplying each laser frame with the inverted masked image (e.g., seedless portion mask). Further, absolute difference between consecutive images in the plurality of first type of masked images and the second type of masked images is determined to obtain a plurality of first type of resultant images and a plurality of second type of resultant images. In other words, adjacent laser frames for both seed and seedless output frames are subtracted and absolute values of N−1 laser frames for both seed and seedless portion mask are determined. Here, the first type of resultant images and the second type of resultant images represent output images obtained after determining absolute values of N−1 laser frames for both seed and seedless portion mask respectively and are of dimensions [X,Y,N−1]. Furthermore, a first type of array and a second type of array is obtained by performing a flattening operation on the plurality of first type of resultant images and the plurality of second type of resultant images and a cross over point of histogram plots of the first type of array and the second type of array is determined. Here, the dimensions of the first type of array and the second type of array is [X*Y*(N−1), 1] and the cross over point is computed as the first threshold. FIGS. 10A and 10B illustrate histogram plots of a maize seed and a coffee seed respectively to compute the first threshold according to some embodiments of the present disclosure. As can be seen in FIGS. 10A and 10B, a point where seed and seedless histogram plot for the maize seed and coffee seed intersect is selected as the first threshold $T_0$. In an embodiment, the computed threshold value $T_0$ for maize and coffee seed as shown in FIGS. 10A and 10B are 9.5 and 20.0 respectively.

Figure 11:
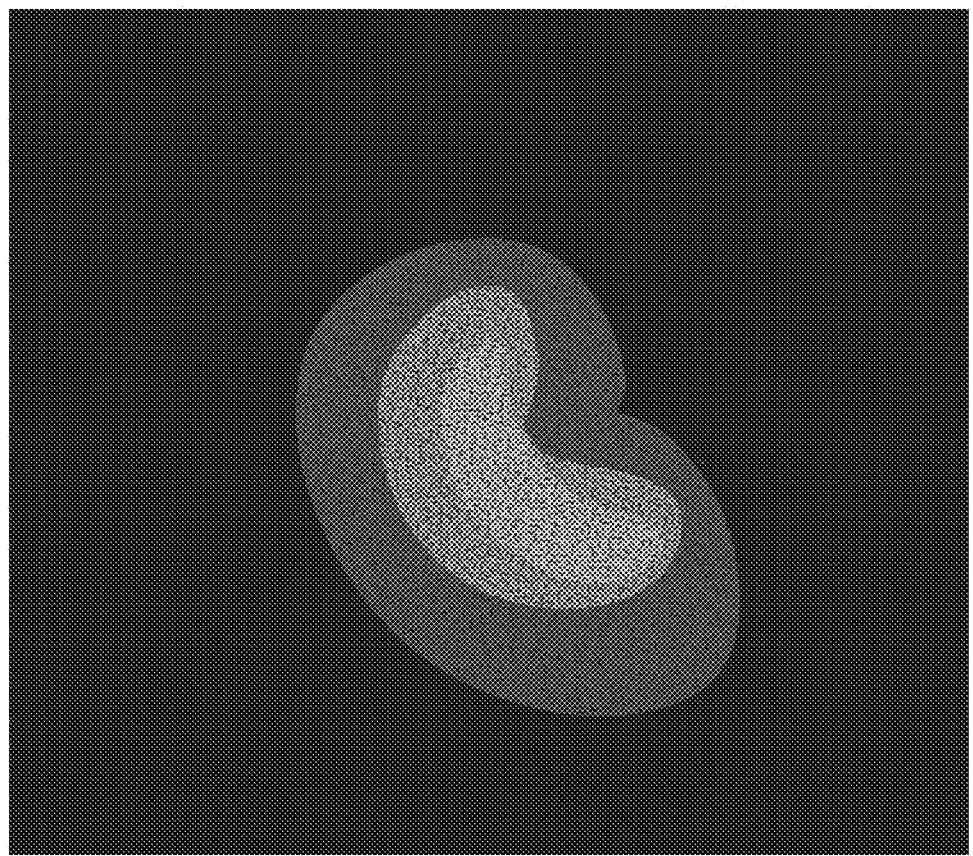
FIG. 11 shows an example of an image obtained as an output of an automated speckle activity map based bio dynamic speckle analysis technique according to some embodiments of the present disclosure.

Referring back to the steps executed by the automated speckle activity map based dynamic speckle analysis technique, the plurality of difference images having a value assigned to each pixel are added to obtain a resultant image. In an embodiment, addition of the plurality of difference images is performed along third dimension of D matrix and the resultant image obtained is stored as a S matrix of dimension [X, Y]. The In an embodiment, the resultant image represents output of the automated speckle activity map based dynamic speckle analysis technique. FIG. 11 shows an example of an image obtained as the output of an automated speckle activity map based dynamic speckle analysis technique according to some embodiments of the present disclosure. Further, based on a comparison of each pixel of the resultant image with a second threshold, the third type of image is obtained. In an embodiment, the second threshold lies in a predefined range of 0.5 to 0.7. In an embodiment, S matrix is normalized with maximum value in S matrix to provide a normalized matrix represented by $S_{norm}$. Every pixel with value greater than 0.7 in the $S_{norm}$ matrix is assigned a value 1and remaining pixels are assigned a value 0.

Figure 12:
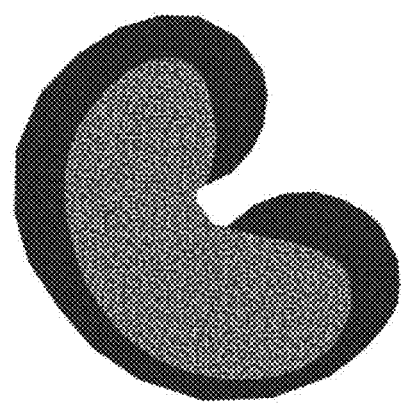
FIG. 12 shows an example of a target image to detect area indicative of the level of the one or more activities occurring within the target object according to some embodiments of the present disclosure.

In an embodiment of the present disclosure, at step 508, the one or more hardware processors 118C are configured to determine, a target image by multiplying the third type of image with the masked image. In an embodiment, an area indicative of a level of one or more activities occurring within the target object is detected from the target. In an embodiment, prior to step 508, a thresholding operation is performed on the third type of image. In an embodiment, the one or more activities occurring within the target object may include but not limited to biological activities such as brownian movement, water molecule movement, nutrient movement, and/or the like if the target object is a seed. FIG. 12 shows an example of the target image to detect area indicative of the level of the one or more activities occurring within the target object according to some embodiments of the present disclosure. As shown in FIG. 12, area covered in dark shaded area indicate low level of activity and area covered in light shaded area indicate high level of activity within the seed.

Experimental Results:

Table 2 provides a performance comparison of the method of present disclosure with conventional approaches for different specimens in terms of timing analysis.

TABLE 2

| Specimen Datasets | Approach 1 (Second) | Approach 1 (Seconds) | Approach 1 (Seconds) | Method of present disclosure (Seconds) |
|---|---|---|---|---|
| Fungus (800 × 800 × 132) | 0.4235 | 13.814 | 0.4601 | 0.2310 |
| Maize Seed (490 × 256 × 100) | 0.1144 | 22.022 | 0.0572 | 0.0804 |
| Coffee Seed (448 × 448 × 100) | 0.232 | 64.297 | 0.1183 | 0.1665 |
| Brown Bean (1080 × 1920 × 200) | 4.707 | 1665.878 | 1.784 | 2.613 |

It is observed from the timing analysis provided in Table 2 that the method of the present disclosure is more efficient than approach 1 and approach 2 for all specimen datasets. Though, the approach 3 is more efficient in comparison to the method of the present disclosure, visual information provided by the method of present disclosure is more than approach 3 for all datasets.

Figure 13A:
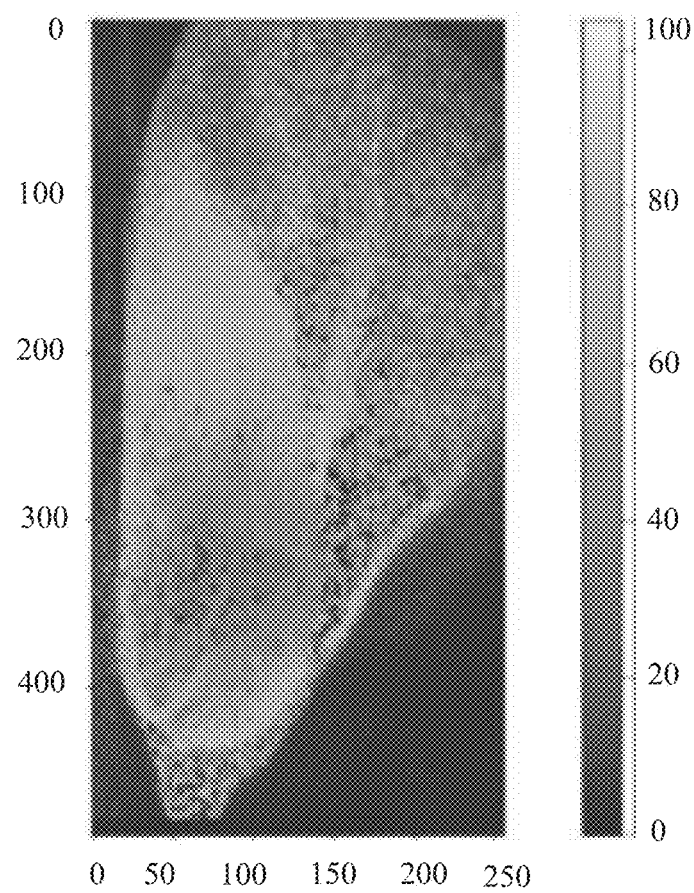
FIGS. 13A through 13D provide a performance comparison of the method of the present disclosure with traditional methods for maize seed using visual maps according to some embodiments of the present disclosure.
Figure 13B:
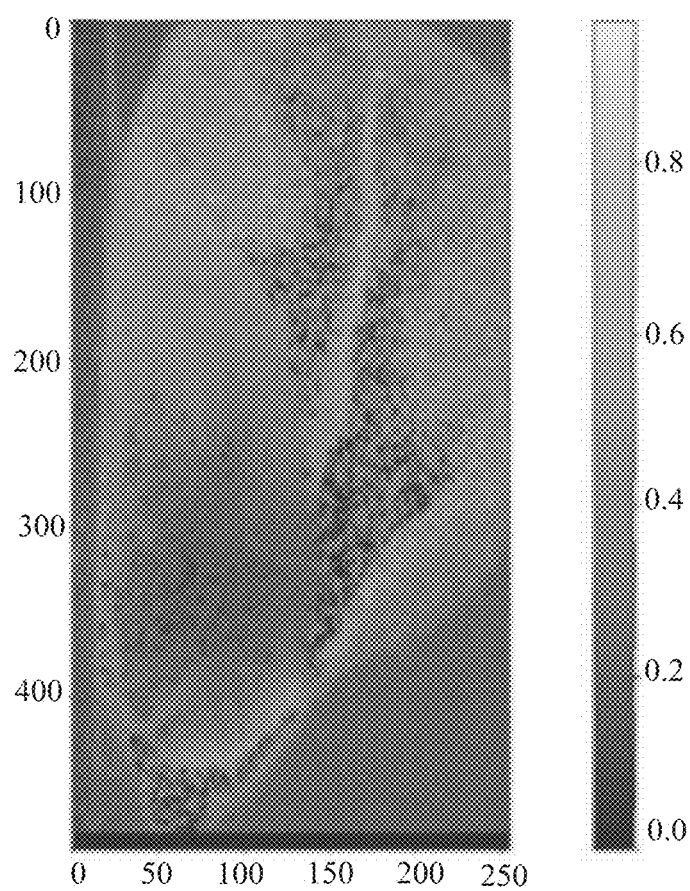
Figure 13C:
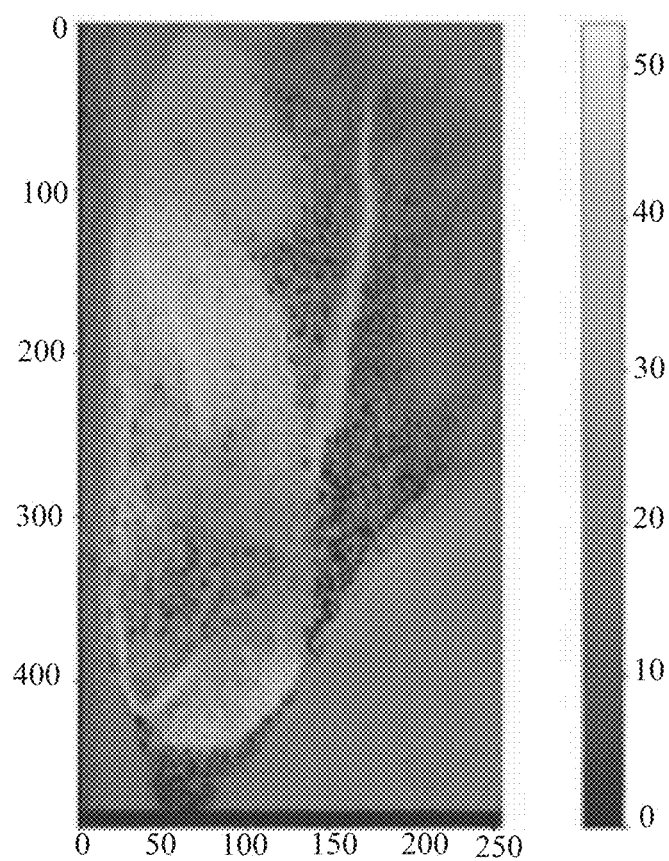
Figure 13D:
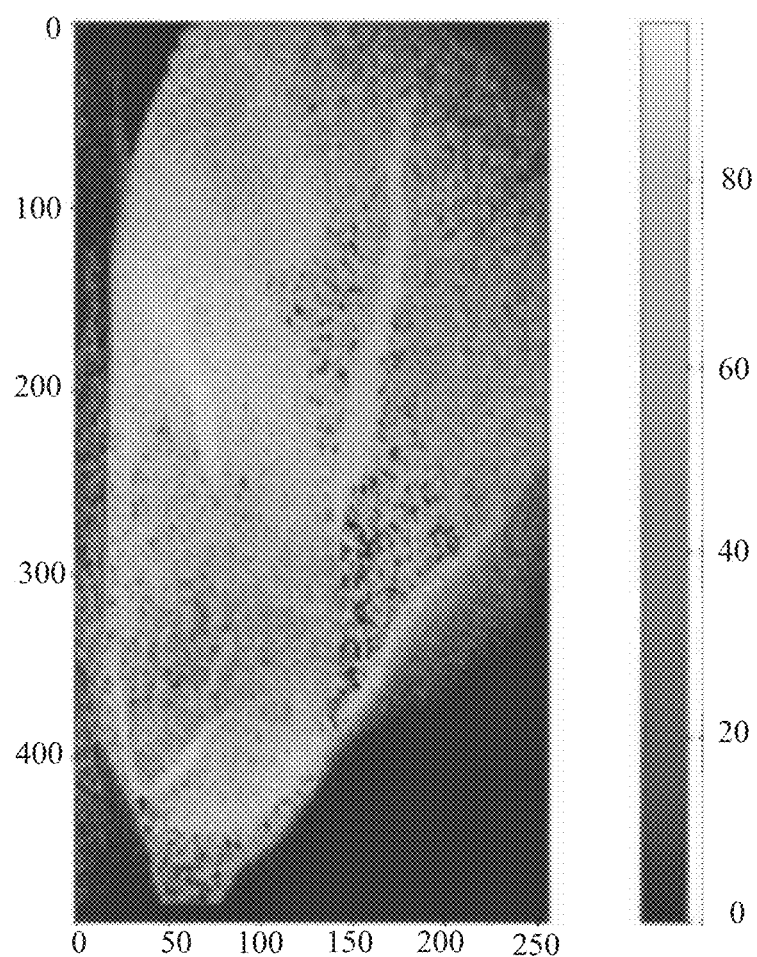

FIGS. 13A through 13D provides a performance comparison of the method of the present disclosure with traditional methods for maize seed using visual maps according to some embodiments of the present disclosure. FIG. 13D provides a visual map representation for analyzing performance of the method of the present disclosure for maize seed.

Figure 14A:
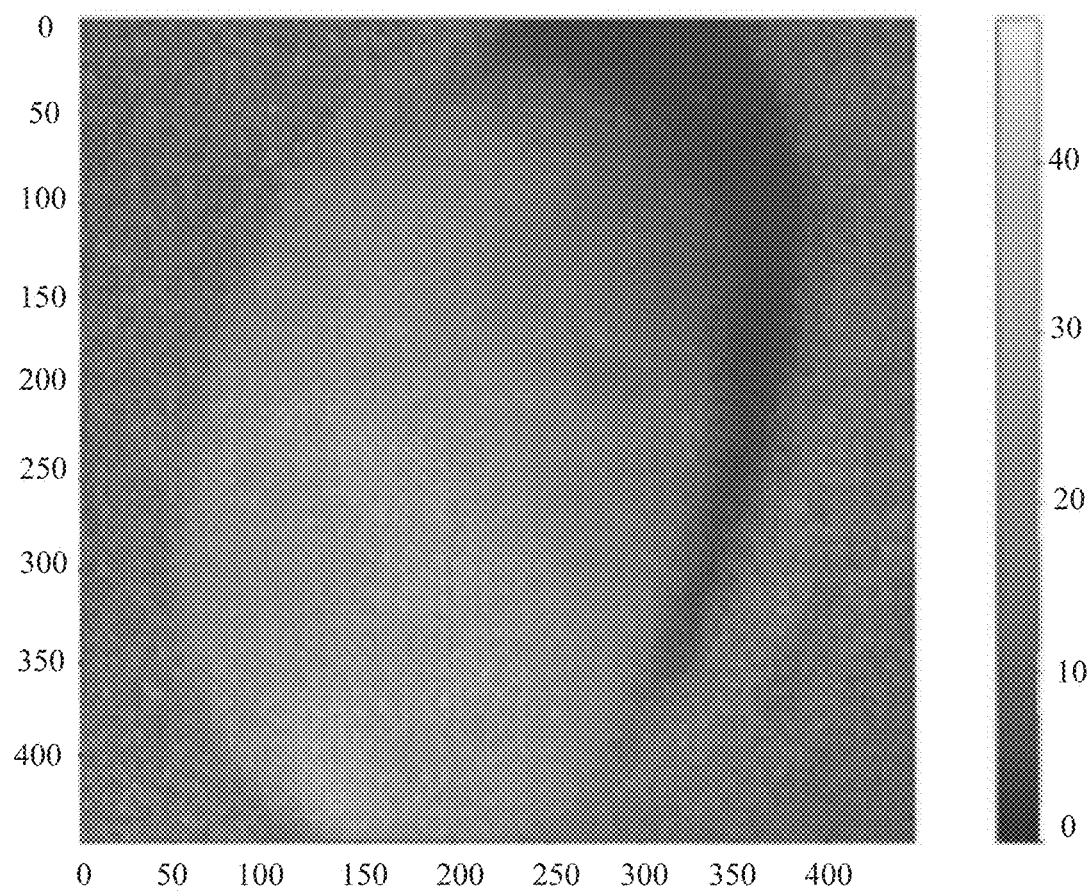
FIGS. 14A through 14D provide a performance comparison of the method of the present disclosure with traditional methods for coffee seed using visual maps according to some embodiments of the present disclosure.
Figure 14B:
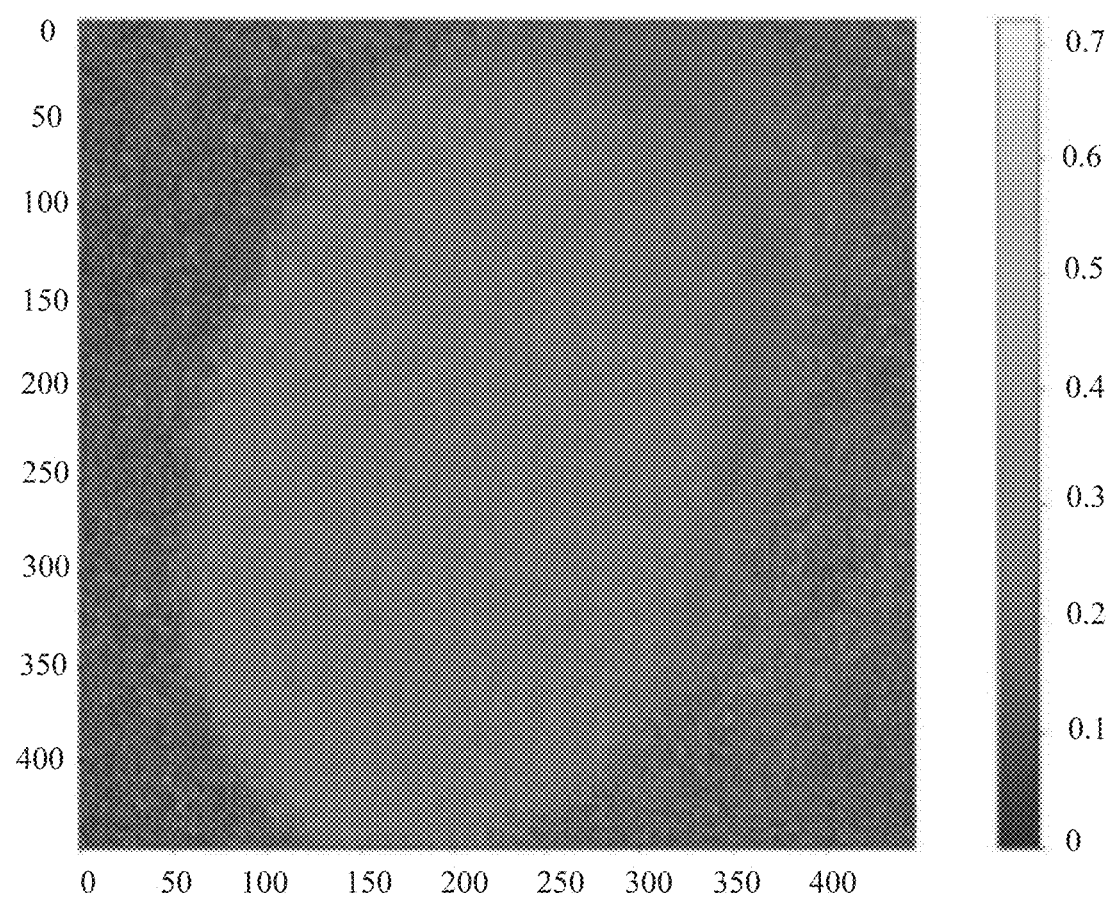
Figure 14C:
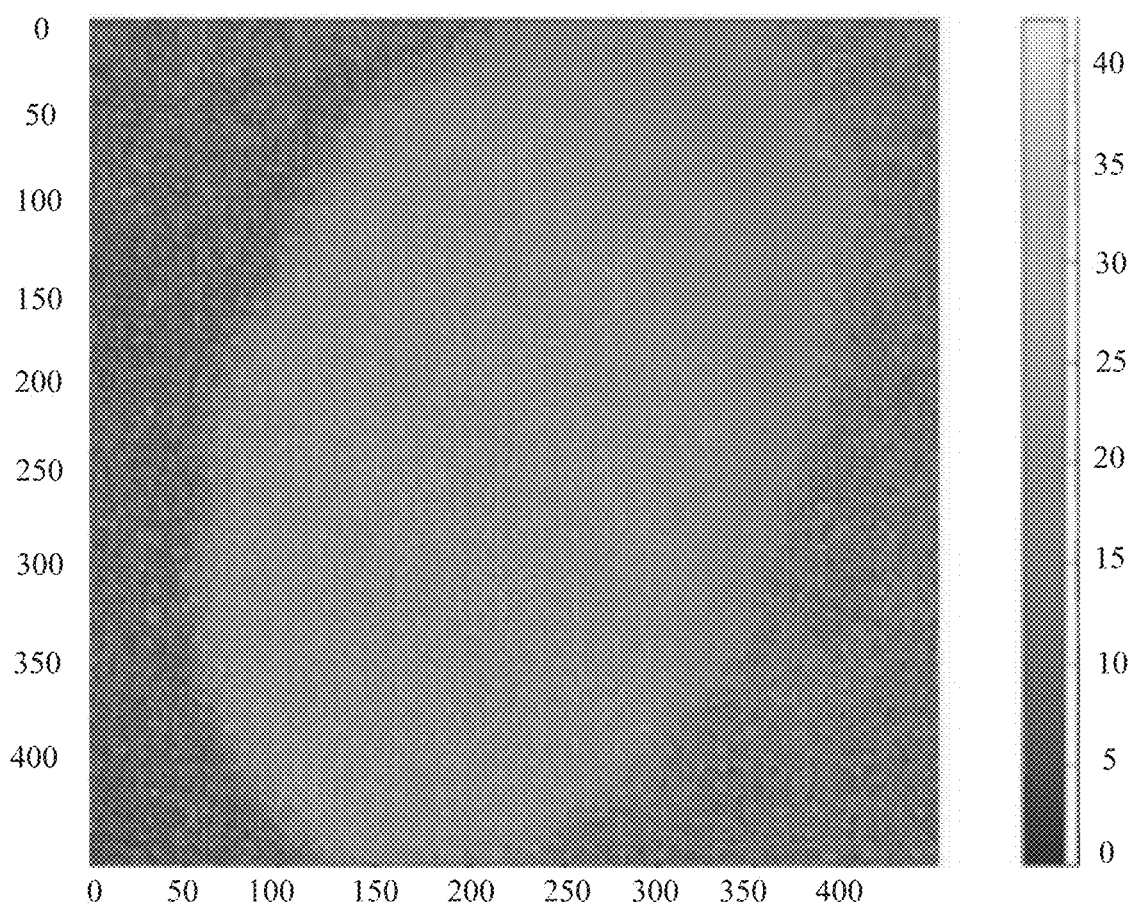
Figure 14D:
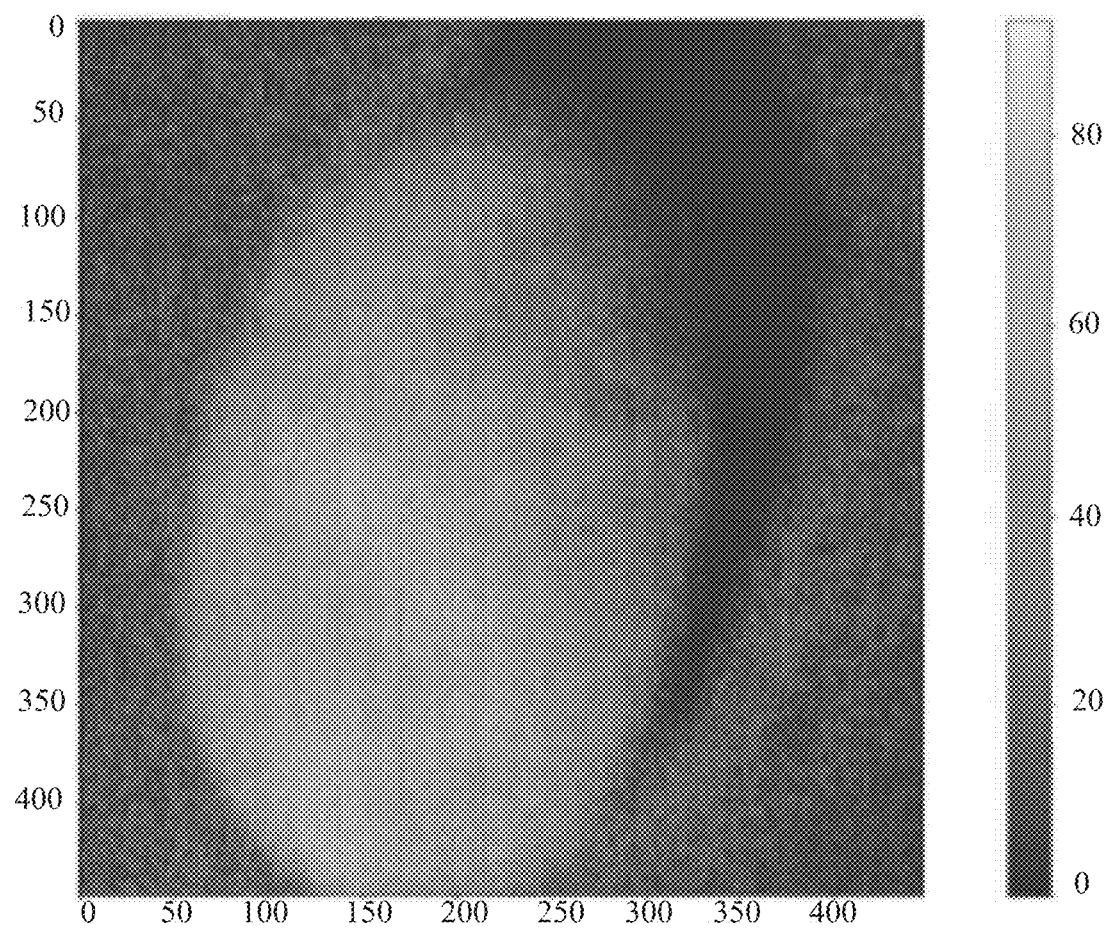

Similarly, FIGS. 14A through 14D provides a performance comparison of the method of the present disclosure with traditional methods for coffee seed using visual maps according to some embodiments of the present disclosure. FIG. 14D provides a visual map representation for analyzing performance of the method of the present disclosure for coffee seed.

It is observed form FIGS. 13A through 14D that better visual maps are provided by the method of present disclosure for both maize seed and coffee seed are better in comparison to the traditional methods such as General difference, Lasca and Fuji. Further, it is observed that the method of the present disclosure is more or less qualitative and helps in enhancing contrast between different activity regions or visualize features better.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of capturing variations in speckle patterns where noise is completely removed and dependency on intensity of variations in speckle patterns is eliminated. The present disclosure is directed to a portable speckle imaging system and method for automated speckle activity map based dynamic speckle analysis. The system and method of the present disclosure performs well in terms of time efficiency and visual cues and requires minimal human intervention.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A portable laser speckle imaging system, comprising:
   a power source;
   a first light source with a holder support positioned to emit a beam towards a target object;
   an image capturing device positioned to receive illumination scattered from the target object;
   a second light source positioned in line with the image capturing device to enable white illumination on the target object;
   an attenuator to control intensity of the beam emitted by the first light source;
   a beam expander positioned between the first light source and the attenuator to control size of the beam emitted by the first light source;
   a polarizer lens positioned between the attenuator and the target object to polarize the beam emitted by the first light source; and
   a controller unit operably connected to the first light source, the image capturing device, and the second light source, wherein the controller unit comprises:

one or more data storage devices configured to store instructions;
one or more communication interfaces; and
one or more hardware processors operatively coupled to the one or more data storage devices via the one or more communication interfaces, wherein the one or more hardware processors are configured by the instructions to:
  acquire, a plurality of first type of images and a second type of image of the target object from the image capturing device, wherein the plurality of first type of images are acquired when the target object is illuminated by the first light source and the second type of image is acquired when the target object is illuminated by the second light source;
  perform, one or more masking operations on the second type of image to obtain a masked image;
  obtain, by performing an automated speckle activity map based dynamic speckle analysis technique on the plurality of first type of images, a third type of image, wherein obtaining the third type of image by performing the automated speckle activity map based dynamic speckle analysis comprises:
    determining absolute difference between consecutive images in the plurality of first type of images to obtain a plurality of difference images;
    assigning, a value to each pixel of each of the plurality of difference images based on a comparison with a first threshold;
    adding the plurality of difference images having a value assigned to each pixel to obtain a resultant image; and
    obtaining, based on a comparison of each pixel of the resultant image with a second threshold, the third type of image; and
  determine a target image by multiplying the third type of image with the masked image, wherein an area indicative of a level of one or more activities occurring within the target object is detected from the target image.

2. The system of claim 1, wherein the first threshold is computed by:
  determining, in a simultaneous manner, a product of the plurality of first type of images with the masked image and an inverted masked image to obtain a plurality of first type of masked images and a plurality of second type of masked images;
  determining absolute difference between consecutive images in the plurality of first type of masked images and the second type of masked images to obtain a plurality of first type of resultant images and a plurality of second type of resultant images;
  obtaining a first type of array and a second type of array by performing a flattening operation on the plurality of first type of resultant images and the plurality of second type of resultant images; and
  determining a cross over point of histogram plots of the first type of array and the second type of array, wherein the cross over point is computed as the first threshold.

3. The system of claim 1, wherein the first light source is a coherent light source that includes a laser light emitter.

4. The system of claim 1, wherein the second light source includes at least one of (i) a ring light that comprises an array of light emitting diodes arranged in a circular pattern, and (ii) a white light source with a front trasmittive diffuser.

5. The system of claim 1, wherein each of the plurality of first type of image represents a laser speckle image and the second type of image represents a white light image.

6. The system of claim 1, wherein the one or more masking operations performed on the second type of image to obtain the masked image include background subtraction and thresholding.

7. The system of claim 1, wherein the inverted masked image is obtained by performing a foreground detection on the second type of image.

8. A processor implemented method, comprising:
  acquiring, a plurality of first type of images and a second type of image of the target object from the image capturing device, wherein the plurality of first type of images are acquired when the target object is illuminated by the first light source and the second type of image is acquired when the target object is illuminated by the second light source;
  performing, one or more masking operations on the second type of image to obtain a masked image;
  obtaining, by performing an automated speckle activity map based dynamic speckle analysis technique on the plurality of first type of images, a third type of image, wherein obtaining the third type of image by performing the automated speckle activity map based dynamic speckle analysis comprises:
    determining absolute difference between consecutive images in the plurality of first type of images to obtain a plurality of difference images;
    assigning, a value to each pixel of each of the plurality of difference images based on a comparison with a first threshold;
    adding the plurality of difference images having a value assigned to each pixel to obtain a resultant image; and
    obtaining, based on a comparison of each pixel of the resultant image with a second threshold, the third type of image; and
  determining, a target image by multiplying the third type of image with the masked image, wherein an area indicative of a level of one or more activities occurring within the target object is detected from the target image.

9. The method of claim 8, wherein the first threshold is computed by:
  determining, in a simultaneous manner, a product of the plurality of first type of images with the masked image and an inverted masked image to obtain a plurality of first type of masked images and a plurality of second type of masked images;
  determining absolute difference between consecutive images in the plurality of first type of masked images and the second type of masked images to obtain a plurality of first type of resultant images and a plurality of second type of resultant images;
  obtaining a first type of array and a second type of array by performing a flattening operation on the plurality of first type of resultant images and the plurality of second type of resultant images; and
  determining a cross over point of histogram plots of the first type of array and the second type of array, wherein the cross over point is computed as the first threshold.

10. The method of claim 8, wherein the first light source is a coherent light source that includes a laser light emitter.

11. The method of claim 8, wherein the second light source includes at least one of (i) a ring light that comprises an array of light emitting diodes arranged in a circular pattern and (ii) a white light source with a front trasmittive diffuser.

12. The method of claim 8, wherein each of the plurality of first type of image represents a laser speckle image and the second type of image represents a white light image.

13. The method of claim 8, wherein the one or more masking operations performed on the second type of image to obtain the masked image include background subtraction and thresholding.

14. The method of claim 8, wherein the inverted masked image is obtained by performing a foreground detection on the second type of image.

15. One or more non-transitory computer readable mediums comprising one or more instructions which when executed by one or more hardware processors cause:

acquiring, a plurality of first type of images and a second type of image of the target object from the image capturing device, wherein the plurality of first type of images are acquired when the target object is illuminated by the first light source and the second type of image is acquired when the target object is illuminated by the second light source;

performing, one or more masking operations on the second type of image to obtain a masked image;

obtaining, by performing an automated speckle activity map based dynamic speckle analysis technique on the plurality of first type of images, a third type of image, wherein obtaining the third type of image by performing the automated speckle activity map based dynamic speckle analysis comprises:

determining absolute difference between consecutive images in the plurality of first type of images to obtain a plurality of difference images;

assigning, a value to each pixel of each of the plurality of difference images based on a comparison with a first threshold;

adding the plurality of difference images having a value assigned to each pixel to obtain a resultant image; and obtaining, based on a comparison of each pixel of the resultant image with a second threshold, the third type of image; and determining, a target image by multiplying the third type of image with the masked image, wherein an area indicative of a level of one or more activities occurring within the target object is detected from the target image.

\* \* \* \* \*